No. 708,969. Patented Sept. 9, 1902.
T. E. MURRAY & J. VAN VLECK.
ELECTRIC RAILWAY.
(Application filed Mar. 14, 1902.)

(No Model.) 8 Sheets—Sheet 1.

WITNESSES:

INVENTORS
Thomas E. Murray
John Van Vleck
BY
their
ATTORNEY

No. 708,969. Patented Sept. 9, 1902.
T. E. MURRAY & J. VAN VLECK.
ELECTRIC RAILWAY.
(Application filed Mar. 14, 1902.)
(No Model.)
8 Sheets—Sheet 2.

Fig. 4.

WITNESSES:

INVENTORS
Thomas E. Murray
John Van Vleck
BY
their ATTORNEY

No. 708,969. Patented Sept. 9, 1902.
T. E. MURRAY & J. VAN VLECK.
ELECTRIC RAILWAY.
(Application filed Mar. 14, 1902.)

(No Model.) 8 Sheets—Sheet 3.

Fig. 5.

WITNESSES: INVENTORS
Thomas E. Murray
John Van Vleck
BY
Their ATTORNEY

No. 708,969. Patented Sept. 9, 1902.
T. E. MURRAY & J. VAN VLECK.
ELECTRIC RAILWAY.
(Application filed Mar. 14, 1902.)

(No Model.) 8 Sheets—Sheet 4.

Fig. 6.

WITNESSES: INVENTORS
Thomas E. Murray
John Van Vleck
BY
their ATTORNEY

No. 708,969.

T. E. MURRAY & J. VAN VLECK.
ELECTRIC RAILWAY.
(Application filed Mar. 14, 1902.)

Patented Sept. 9, 1902.

(No Model.)

WITNESSES:

INVENTORS
Thomas E. Murray
John Van Vleck
BY
their
ATTORNEY

No. 708,969. Patented Sept. 9, 1902.
T. E. MURRAY & J. VAN VLECK.
ELECTRIC RAILWAY.
(Application filed Mar. 14, 1902.)
(No Model.)
8 Sheets—Sheet 6.

Fig. 8.

WITNESSES:

INVENTORS
Thomas E. Murray
John Van Vleck
BY their
ATTORNEY

No. 708,969. Patented Sept. 9, 1902.
T. E. MURRAY & J. VAN VLECK.
ELECTRIC RAILWAY.
(Application filed Mar. 14, 1902.)

(No Model.) 8 Sheets—Sheet 7.

WITNESSES:

INVENTORS
Thomas E. Murray
John Van Vleck
BY
their
ATTORNEY

No. 708,969. Patented Sept. 9, 1902.
T. E. MURRAY & J. VAN VLECK.
ELECTRIC RAILWAY.
(Application filed Mar. 14, 1902.)
(No Model.) 8 Sheets—Sheet 8.

WITNESSES:

INVENTORS
Thomas E. Murray
John Van Vleck
BY
ATTORNEY

UNITED STATES PATENT OFFICE.

THOMAS E. MURRAY AND JOHN VAN VLECK, OF NEW YORK, N. Y.

ELECTRIC RAILWAY.

SPECIFICATION forming part of Letters Patent No. 708,969, dated September 9, 1902.

Original application filed November 22, 1901, Serial No. 83,318. Divided and this application filed March 14, 1902. Serial No. 93,238. (No model.)

*To all whom it may concern:*

Be it known that we, THOMAS E. MURRAY and JOHN VAN VLECK, of the city, county, and State of New York, have invented a new and useful Improvement in Electric Railways, of which the following is a specification.

The object of our invention is to provide an electric railway for the conveyance of parcels, mail, and other matter in which the cars shall be operated automatically.

Our invention consists in an electric railway having a track and stations disposed at intervals along the same and also cars electrically propelled on said track.

Our present application is a division of our application Serial No. 83,318, filed November 22, 1901, and relates more particularly to the construction and arrangement of the brake mechanism and associated devices, all as pointed out in the claims. The general construction and arrangement of our apparatus is such that, first, a car starting from a principal depot or any given station will automatically proceed to and stop at any other given station; second, prior to reaching the predetermined station said car will automatically close a switch for leading it upon the station-siding; third, prior to reaching the predetermined station the strength of the current actuating said car will be automatically reduced; fourth, prior to reaching the predetermined station an electric brake mechanism will be automatically applied to retard the motion of the car; fifth, the line conductors in proximity to the track are disposed in block-sections and by means of suitable automatic mechanism the section next to and immediately succeeding that upon which the car is advancing is rendered dead, so protecting the car from rear collisions; sixth, the car mechanism being adjusted for a predetermined or normal speed any excess speed will result in the automatic operating of mechanism to reduce said speed to normal; seventh, in event of the automatic switch-controlling mechanism not properly setting the switch the car is automatically arrested before the switch is reached and cannot proceed until the failure is corrected; eighth, the track is double and stations are located on loops extending from one track to the other, but in a different plane—that is to say, the loop may preferably rise over the tracks or descend below them—the stations being located on said loops; ninth, in case a car passing from a loop to main track comes in danger of rear collision with a car on said main track said first-named car is automatically stopped; tenth, in case a car on main track comes in danger of rear collision with a car coming to main track from a loop said first-named car is automatically stopped.

In the accompanying drawings the various parts and combinations, together with the electrical mechanisms and connections, are shown symbolically. In each figure representing electrical circuits and connections live connections through which currents are passing under the described conditions are indicated by thick lines.

In the accompanying drawings.

Similar letters and numbers of reference indicate like parts.

The system includes—

First. A double track A A$^2$, a rail A$^7$ of which serves as the return-conductor and is traversed by a return-trolley T$^7$ on the car.

Second. A main feeder-line D, which extends alongside the track.

Third. A main trolley-line L′, from which current is taken by a trolley T′ on the car to the motor. This line extends parallel to the track and is divided into block-sections.

Fourth. A breaker-line L$^6$. This line is in sections corresponding to those of L′ and extends parallel to the tracks. It is traversed by a trolley T$^6$ on the car. Its function is, in connection with suitable devices to be described, to render dead the block-section of L′, which immediately follows the block-section on which the car is traveling.

Fifth. A station-line L$^2$. This is a short section of line extending parallel to the tracks and for a certain distance in advance of each station. When encountered and traversed by a trolley T$^2$ on the car, its function is, through suitable devices to be described, to supply current to operate the motor and run the car to the station at a reduced rate of speed.

Sixth. A switch-line L$^3$. This is a short section of line parallel to the tracks and disposed in advance of each of the turnout-switches which divert the car from the main line to a station. When encountered and traversed by a trolley T$^3$ on the car, its function is, in connection with station-line L$^2$ and suitable devices to be described, to close the switch in advance of the car.

Seventh. A safety-line L$^4$. This is a short section of line parallel to the tracks and disposed in advance of each switch. When encountered and traversed by a trolley T$^4$ and in connection with suitable devices to be described, its function is to cut off current to the car-motor and apply the brakes in case the switch should fail to be properly opened or closed.

The car E may be of any suitable construction, provided with the usual trucks running on the rails, and with any suitable electric-motor mechanism, (represented symbolically at K.) In addition and coöperating with the line system it carries four principal devices, with the necessary associated electrical and mechanical connections—namely, first, an automatic brake mechanism U; second, a controller V, whereby the current actuating the motor and the brake is controlled; third, a centrifugal governor G, constructed and operating to regulate the strength of the current proceeding to the controller in accordance with the speed of rotation of a car-truck; fourth, a directing-arm P, carrying the trolley T$^2$, whereby contact is made with the station-line L$^2$.

There is located at each station—

First. A turnout-loop. This is a track-section connecting by a switch from one track preferably rising up and over the other track and finally descending to join the last-named track. The station is preferably situated on a straight portion of the loop which is parallel to and over the return-track.

Second. A station-line L$^2$, located in a definite position peculiar to that station, and hence in a different position at each station and requiring, therefore, that the directing-arm P, carrying the trolley T$^2$, shall be set in some predetermined position in order that said trolley may make contact with said line on reaching it. This is the selective device, whereby a car having its directing-arm P set in definite position will be automatically switched off upon the loop only of that station which has its line L$^2$ placed to receive the arm P when thus set, or, to put it another way, it may be imagined that if arm P is set at a certain angle its trolley T$^2$ will meet only line L$^2$ of station 1, if set at a certain greater angle only line L$^2$ of station 2, and so on, the station at which the car will be switched off from the main line being therefore determined by the position given to the directing-arm P.

Third. A switch mechanism and electric controlling devices so constructed and arranged as that when car-trolley L$^3$ makes contact with the short switch-line L$^3$, located in advance of said station, said switch will be closed to permit the car to run upon the loop, and when said trolley T$^3$ runs off said line L$^3$ then said switch will be automatically opened.

Fourth. A safety mechanism and electric controlling devices so constructed and arranged that when the switch is not properly closed or opened then through the contact of trolley T$^4$ with the short safety-line L$^4$, located in advance of said station, suitable mechanism is operated to cut off current from the motor and apply the brakes.

Fifth. Branch lines from L$^6$ and L$^4$ and associated electric mechanism whereby a car coming from the station-loop to the main track is prevented from running into a car on said main track by being held at rest until the last-named car has left the block on which it is running; also, so that a car running on the main track will be prevented from overtaking a car coming upon said main track from said station-loop by being retarded or stopped until said last-named car has left the main-track block upon which it enters.

Figure 1:
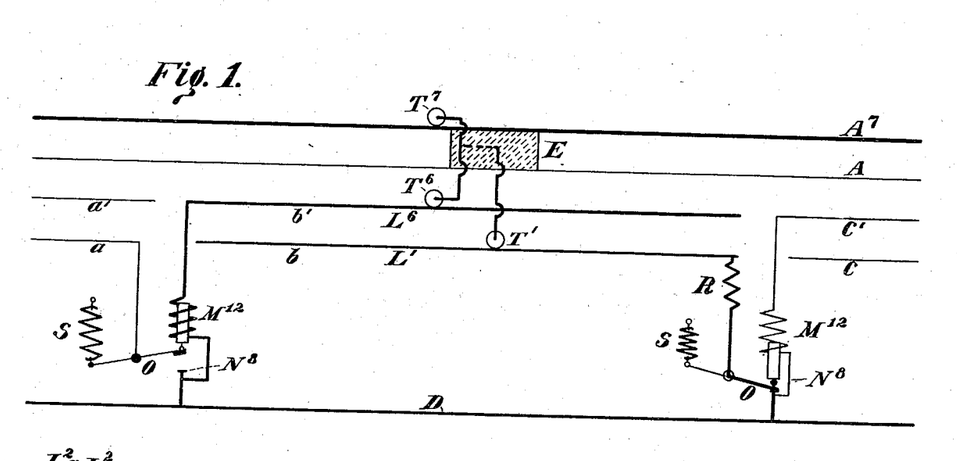
Figure 1 is an electrical diagram in which the car E is also represented symbolically, illustrating the arrangement of the block-sections and associated mechanism.

*The main trolley-line and block system.*— This is illustrated by electrical diagram in Fig. 1. Three block-sections $a\,b\,c$ of the main line L' and a' b' c' of the breaker-line L⁶ are indicated. The car E is located on block b and has a trolley T⁷ in contact with the return-rail A⁷ and trolleys T' and T⁶, both connected to said return-trolley and respectively in contact with lines L' and L⁶. As will be hereinafter explained, current from L' has to pass through controlling and operating mechanism on the car before reaching T⁷, whereas L⁶ is directly connected to trolleys T⁶ and T⁷ to return A⁷, so as to allow current to flow directly from T⁶ to T⁷. Each block-section is connected at one end to the main feeder-line D through a circuit-breaking lever O, which by the action of spring S, attached to it, normally closes contact with the feeder at N⁸, as shown at the right of Fig. 1, so that current proceeds from said feeder to section b of line L', trolley T', return-trolley T⁷, and return-rail A⁷. Each corresponding parallel section of the breaker-line L⁶ is also connected to the main feeder-line D through the coil of a solenoid M¹², and the core of said solenoid is connected to lever O. Consequently when circuit is made from feeder D to breaker-line L⁶, to trolley T⁶, and return-trolley T⁷ and rail A⁷ the solenoid M¹², as shown on the left of Fig. 1, attracts circuit-breaking lever O and opens contact N⁸, so that circuit is broken from feeder D to section a of line L'. Thus the current which passes over a given block-section of L', as b, both actuates the motor and opens the switch which connects the feeder to the next following block-section a, so that the car in moving over the lines is always succeeded by a dead block-section, upon which of course no following car can pass.

*Special block-section.*—It is often desirable that a car in approaching a station or other stopping-point shall slow down. This we effect by interposing a suitable resistance R, Fig. 1, in the branch leading from switch-lever O to the block-section upon which it is desired speed shall be diminished. Thus, as shown on the right of Fig. 1, by reason of the presence of the resistance R less current would pass upon section b than upon section a of line L'. We term a section provided with such a resistance for the purpose stated a "special" block-section.

Figure 2:
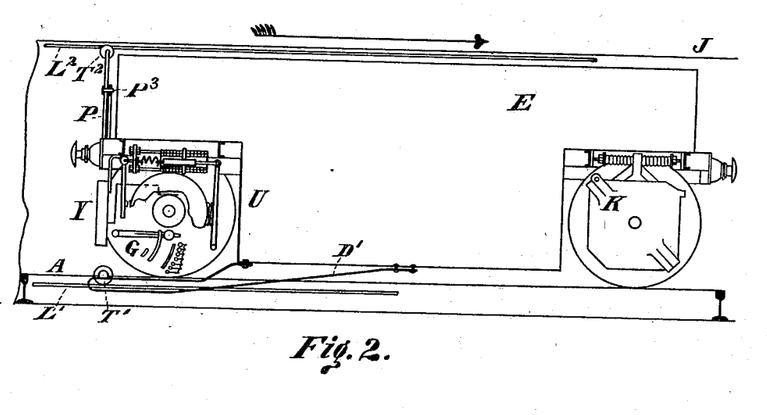
Fig. 2 is a side elevation of the car, track, and certain mechanism of the car and protecting-hood.
Figure 3:
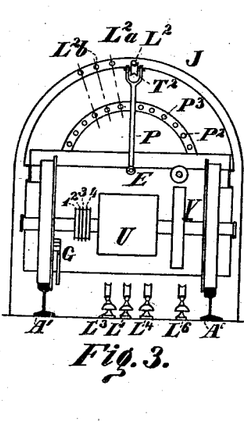
Fig. 3 is an end view of the car and hood.

*The general arrangement of car and hood.*—This is illustrated in Figs. 2 and 3. The hood J is of sheet-steel of cross-section conforming to that of the car E. It extends throughout the entire road and has the rails and various lines L to L⁶ disposed within it. As represented in Fig. 3, all of the lines excepting the station-lines L² are laid on the road-bed between the rails; but this is not essential, as they can of course be placed wherever convenient. The station-line L² is placed on the intrados of the arch, which is a semicircle struck from the pivot-point of directing-arm P (on the car) as a center, so that the trolley T² on said arm may make contact with said line, no matter where around the semicircle the line may be placed. Thus in Fig. 3 the trolley T² is shown in contact with the line L², placed at the summit of the arch, so that the arm P is vertical. This would be the position of the line L² for one station, and the arm P would then make contact with it only when vertical. For another station the line L² might be in the position of L²ᵃ, in which case if it were desired that the car should be switched off at that station the arm P would be suitably inclined. At a third station the position of line L² might be as shown at L²ᵇ, and then the arm P would be still further inclined. In order to adjust the arm P to meet the line L² of any desired station, we provide the semicircular guide-bar P² on the car, on which are openings P³, corresponding in position to all of the station-lines and suitably marked. The arm P may be adjusted over any opening P³ and there held by a pin entering said opening, as shown in Fig. 2, or any other suitable means may be employed for holding said arm in position. The arm is electrically connected with the mechanism which the lines L² are intended to control, as will be hereinafter more fully explained. Before the car is started, therefore, the arm P is adjusted upon opening P³, which corresponds in position to that of the line L² of the station at which it is desired the car shall be automatically switched upon the loop-line there located. Afterward the trolley T² cannot make contact with any station-line L² except the one for which the adjusted position of arm P adapts it, and when it does make contact then the car is switched off at a predetermined station.

As shown in Fig. 2, the motor K is arranged to actuate the car-wheels at one end of the vehicle, and at the other end one wheel carries on its inner side the centrifugal governor G. The automatic brake U and its mechanism are supported from the car-frame in any suitable manner, and so also is the controller V. The series of contact-rings 1 2 3 4 are disposed on the car-axle and suitably insulated and electrically connected, as hereinafter explained. The arrow in Fig. 2 indicates the direction of movement of the car. The trolley T is journaled in the upper side of the doubled bar D', which bar is secured to the under side of the car-body. In passing over switches the lower side of the bar D' meets the rails and so lifts the trolley T' clear of the junction and prevents injury to it.

Figure 4:
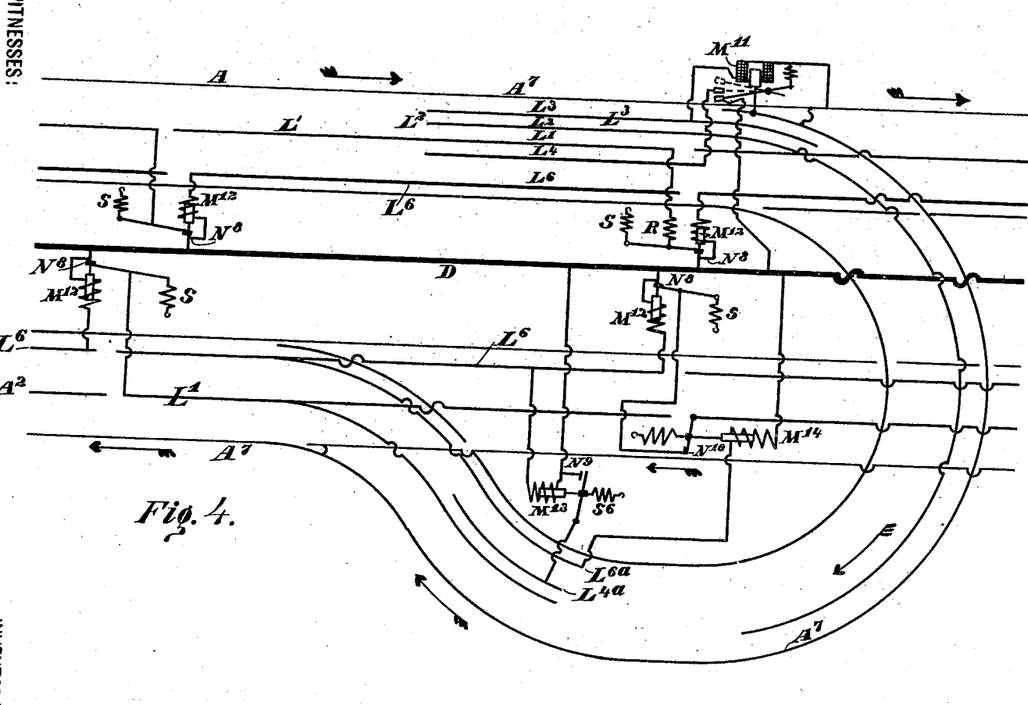
Fig. 4 is an electrical diagram showing the general arrangement of tracks, station-loops, and various lines adjacent to a station.

*The general arrangement of turnout-loop and lines at a station.*—This is shown diagrammatically and in plan in Fig. 4. The main feeder-line D is represented between the tracks; but it may be in any convenient position. Of the various circuit-breakers represented in Fig. 4 those having the solenoid M¹² and contact N⁸ and spring S have already been described in connection with Fig. 1. Three others remain of generally similar construction. That having the solenoid M¹¹ and associated parts operates the track-switch whereby the car is shunted to the station-loop. That having the solenoid M[13] and associated parts controls the devices for preventing a car coming from the loop from running into a car on the main track. That having the solenoid M[14] and associated parts controls the devices for preventing a car on the main track from overtaking a car entering the main track from the branch track. The car is supposed to travel on the tracks in the direction of the arrow in Fig. 4. For convenience hereinafter the track from which the car passes over the loop is termed the "up-track" and the other track the "down-track." The block-section of L' on the up-track immediately preceding the switch leading to the loop contains resistance R, and hence is a special block-section.

Figure 5:
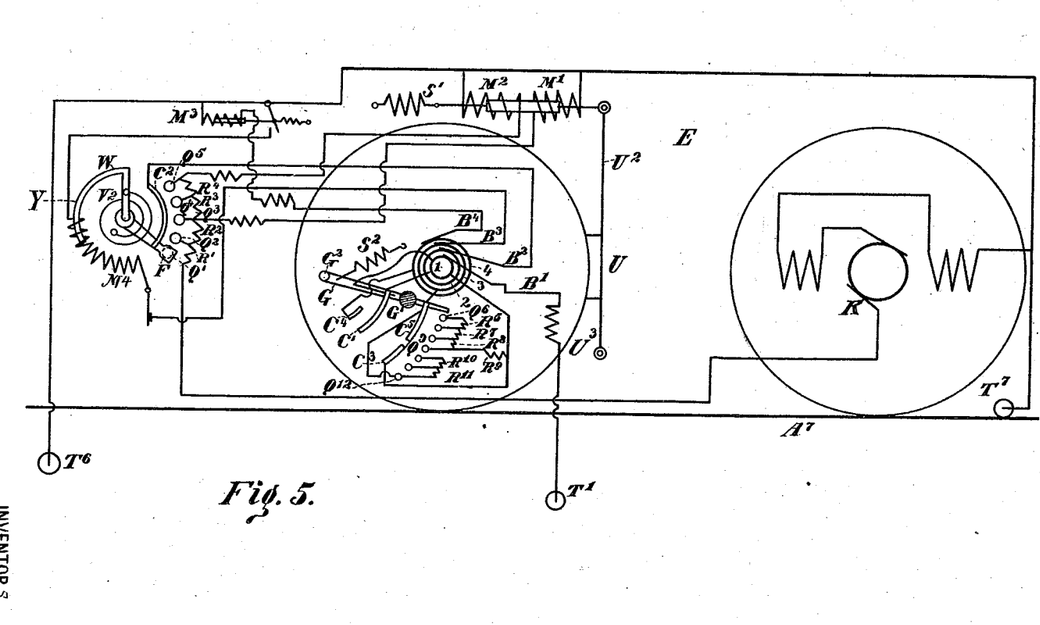
Fig. 5 is an electrical diagram showing the relation and position of the various mechanisms and connections with the car at rest on its track.

*The brake, governor, and controlling mechanism of the car.*—These parts can best be described with reference to Fig. 5, which shows all diagrammatically. The car is here at rest. The wheels and return-trolley A[7] are of course on the rails; but none of the trolleys meet any of the various lines. The brake-shoe U is mounted on an arm U[2], pivoted at U[3]. The upper end of arm U[2] is connected to the core of the antagonistic solenoid-coils M[2] and M', and said core is connected to one end of a spring S'. Spring S' normally tends to hold the brake-shoe against the wheel-rim. Solenoid M' when energized acting against the spring withdraws said shoe. Solenoid M[2] when energized reinforces the pull of the spring. The governor consists of an arm G, having at one end a weight G' and pivoted at its other end G[2] to the inside face of one of the car-trucks. The arm is connected to a spring S[2], which normally holds its weighted end near the wheel-center. When the wheel revolves, the centrifugal force tends to throw the weight G' outwardly or toward the wheel-rim against the action of the spring. On the wheel-face are four contact-plates C' C[3] C[4] C[5], with which the governor-arm may make electrical contact, as hereinafter described. The free end of the governor-arm also sweeps over a series of contact-points Q[6] to Q[12], between which are resistances R[6] R[7] R[8] R[10] R[11]. Electrically connected with the governor-arm, contact plates and points are the insulated rings 1 2 3 4 of the car-axle. Against these rings bear brushes B' to B[4]. The controller Y has a pivoted arm W, a curved portion of which enters and forms the core of a curved solenoid M[4]. When said solenoid is energized, it draws in its core and so causes another arm F, connected to arm W, but insulated therefrom, to sweep over a contact-plate C[2]. A volute spring V[2], connected at one end to arm F and at the other end to a fixed point, maintains the end of arm F at one extremity of contact-plate C[2] and also upon the first of a series of contact-points Q' to Q[5], between which contact-points are interposed resistances R' to R[4]. A circuit-breaker M[3] is provided, the object and operation of which will appear as the operation of the whole is developed.

*The operation of the apparatus.*—In order to avoid complication and to render the description clear, we now proceed to assume certain conditions of speed, &c., and to describe the operation of the various mechanisms in these circumstances.

First. The car is running at normal full speed on main line L'. This condition is illustrated diagrammatically in Fig. 6, in which for the sake of clearness the parts of the system not directly affected and acting are omitted. The relation of the weight G' on governor-arm G and the spring S[2], acting on said arm, is to be such that when a predetermined or normal speed of the car is attained said arm shall be thrown outwardly by the centrifugal force due to the rotation of its supporting-wheel. The end of said arm shall make contact with the contact-point Q[9], so cutting out of circuit the resistances R[6], R[7], and R[8]. The "full-speed" current now passes from main line L' to trolley T', to brush B' and ring 1, to and along a conductor on the governor-arm G, but insulated therefrom, to contact-plate C', to ring 2, brush B[2] to controller contact-plate C[2], where the circuit divides, as indicated by the short arrows, part of the current then proceeding by controller-finger F to contact-point Q' and so to the motor K and trolley T[7] to the return-rail A[7] and part through the resistances R', R[2], and R[5] and solenoid M' to said return-trolley T[7]. The solenoid M' then overpowers spring S' and moves the brake-shoe U away from the car-wheel.

Figure 7:
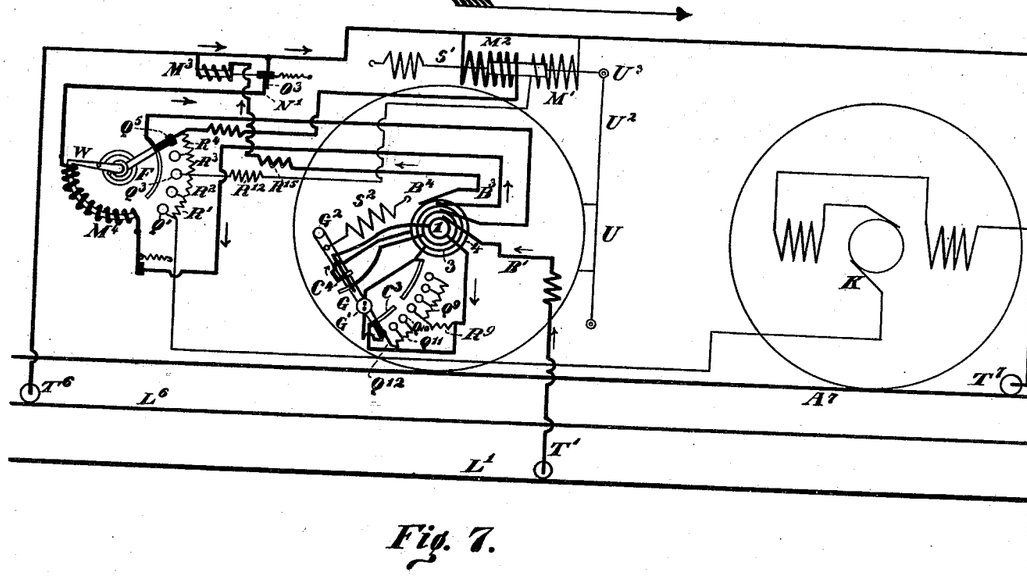
Fig. 7 is an electrical diagram showing the car running at excessively high speed on the main trolley-line and being automatically checked by the centrifugal governor G.

Second. The car attains an excessive speed or a speed greatly above that predetermined and normal. This condition is illustrated in Fig. 7, parts not affected being omitted, as before. By the increased action of the centrifugal force due to the rotation of the car-wheel the governor-arm G is caused to move outwardly until it makes contact with the limiting contact-point Q[12] and with contact-plate C[4]. Current now passes from line L' and trolley T' to brush B', ring 1 to and along a conductor on governor-arm G, but insulated therefrom to contact-plate C[4], to ring 4, brush B[4], resistance R[15], and solenoid M[3] to return-trolley T[7] and return-rail A[7]. Solenoid M[3] being thus energized draws in its core, thus moving its associated pivoted circuit-closing lever O[3] to close contact at N'. Current may now pass from ring 1 to governor-plate C[3], governor-arm G, contact-point Q[12], ring 3, brush B[3], controller-solenoid M[4], and closed contact N' to return. Solenoid M[4], acting on controller-finger F, moves that finger from contact-point Q' to contact-point Q[5], as shown. Q' is connected to one terminal of the motor K, the other terminal of said motor being connected to the return-trolley T[7]. Therefore this movement of finger F brings all of the controlling-resistances R' R[2] R[3] R[4] into the motor-circuit. It will also be observed that while one terminal of the brake-solenoid M' is connected to return the other terminal is connected to controller contact-point $Q^3$. Therefore the controller-resistances $R'$ $R^2$ and the additional resistance $R^{12}$ are also brought into the circuit of that solenoid. The intervention of these resistances into the circuits of both the motor and the solenoid M' reduces the current in both circuits, while in addition full current is established from controller contact-point $Q^5$ through the solenoid $M^2$ to return. The strength of solenoid M' being thus decreased, the spring S' and the opposing solenoid $M^2$ conjointly act to bring the brake-shoe U against the wheel.

Let it now be assumed that, third, the car attains a speed above normal, but not so great as last considered. Still referring to Fig. 7, the governor-arm G will move outward to a less extent and close contact with either contact-point $Q^{10}$ or $Q^{11}$. In such case either or both of the resistances interposed between said contact-plates would be brought into the circuit of controller-solenoid $M^4$, and the controller-finger F would be moved from contact-point $Q'$ to a less extent than before, thus putting in a part of the controller-resistances $R'$ $R^2$, &c., and so cutting off current to the motor until the speed fell to the normal rate, when the governor-arm G would once more return to $Q^9$.

Figure 8:
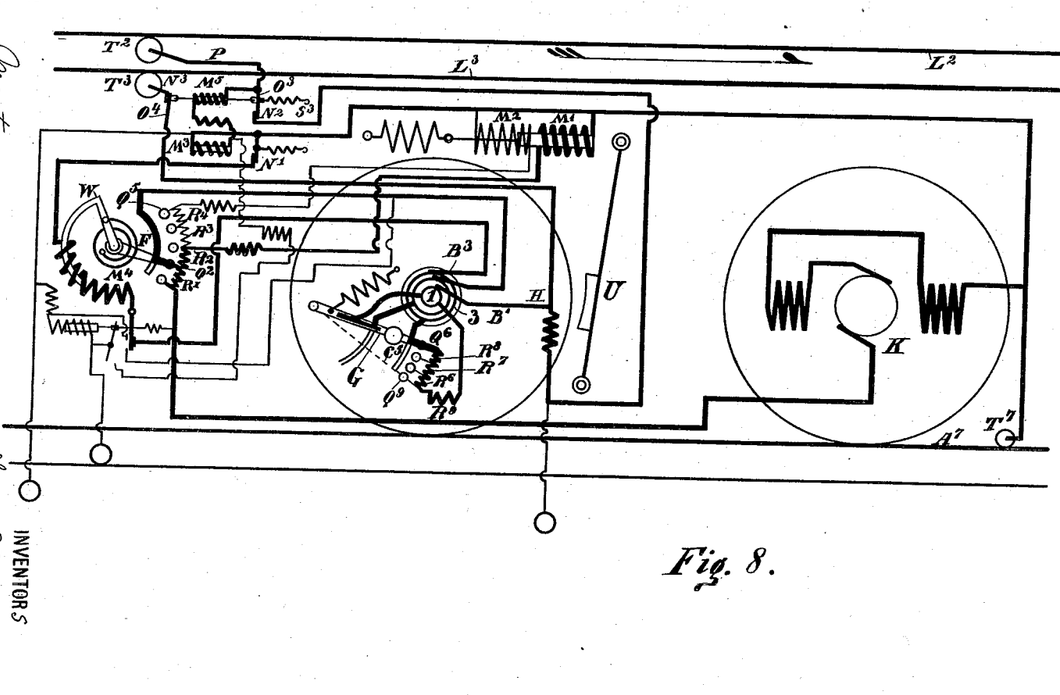
Fig. 8 is an electrical diagram showing the position of parts and mechanism when the car is reduced in speed and runs upon a station-loop.
Figures 9, 10:
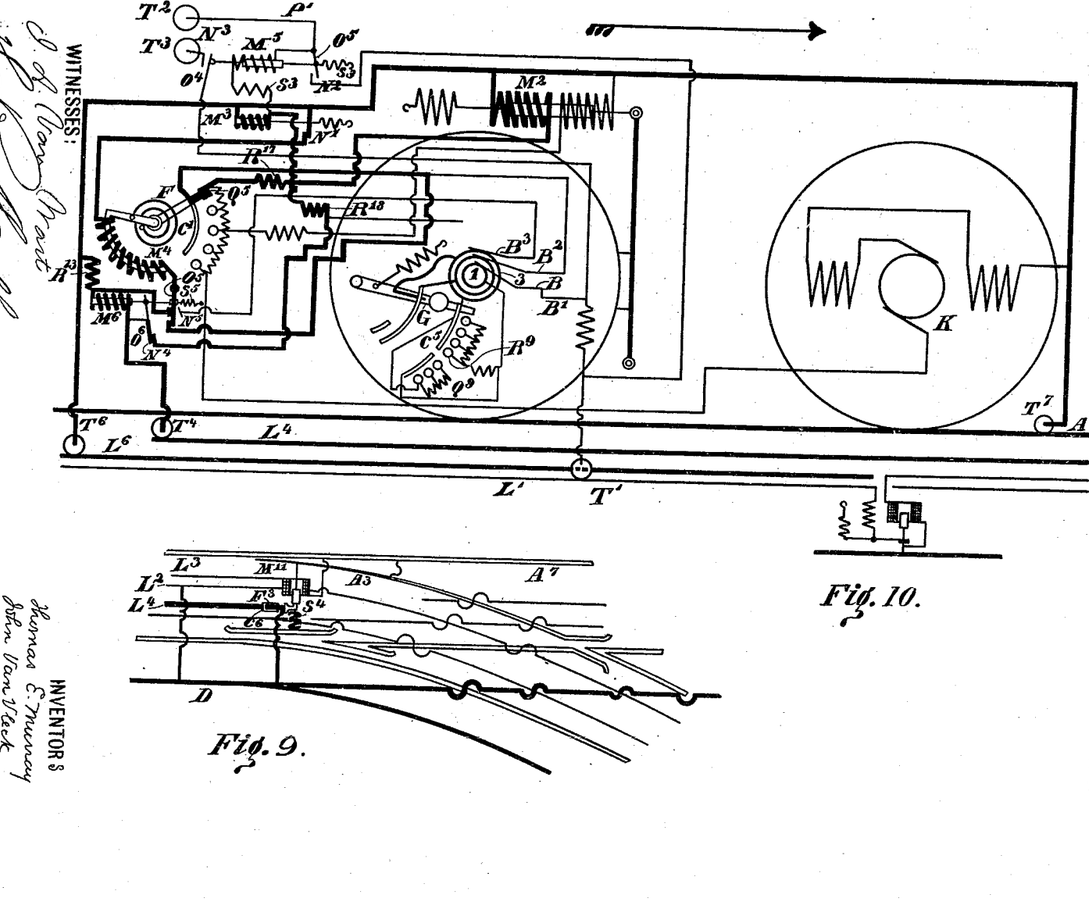
Fig. 9 is a plan view of the switch and its associated controlling mechanism under the conditions just stated.
Fig. 10 is an electrical diagram showing the car running on the main trolley-line, the parts and electrical mechanism being in the position when the turnout-switch has failed to open fully and the car is then being automatically brought to rest.

Having now explained the conditions when the car is at rest and running over the road, we come to those under which the car is shunted off to a predetermined station. We now assume, fourth, the car is running at normal speed and approaches its destined station. The turnout-switch is to be automatically closed and the speed of the car reduced so that it may safely pass over the station-loop. This is illustrated in Fig. 8 and also in Fig. 9, which shows the switch-controlling mechanism in plan. The trolleys $T^2$ and $T^3$ on the car now make contact, respectively, with the station-line $L^2$ and switch-line $L^3$. As shown in Fig. 9, $L^2$ takes current directly from the main feeder-line D. $L^3$ is open at one end and connected at the other through the switch-solenoid $M^{11}$ to return-rail $A^7$. From trolley $T^2$ current passes along a conductor on arm P to solenoid $M^5$. As the main feeder-line D is directly connected to station-line $L^2$, it follows that when trolley $T^2$ on arm P meets the line $L^2$ then current proceeds to solenoid $M^5$ and thence to solenoid $M^3$ and so to return-trolley $T^7$ and rail $A^7$. Solenoid $M^5$ controls through its moving core two circuit-breaking levers $O^4$ $O^3$, both of which are connected to the spring $S^3$, which normally tends to keep open their contact places $N^2$ and $N^3$. Solenoid $M^3$, as already explained, controls contact $N'$. Now when trolley $T^2$ meets station-line $L^2$ current flows through solenoids $M^5$ and $M^3$. Contact $N^2$ being thus closed the current proceeds therefrom to the junction-point H, where it branches. Following one branch it then proceeds to the contact $N^3$ and so to trolley $T^3$, and thus gets on the switch-line $L^3$, which leads it through the switch-actuating solenoid $M^{11}$, Fig. 9, and so to return. The core of solenoid $M^{11}$ is directly connected to the movable switch-rail $A^3$ and also to a spring $S^4$, which normally acts to keep the switch open; but when the solenoid $M^{11}$ is energized, as above described, then it acts to move the switch-rail $A^3$ against the pull of the spring $S^4$ and so to close the switch, and, furthermore, as the trolleys $T^2$ and $T^3$ both meet their lines $L^2$ and $L^3$ considerably in advance of the switch the latter becomes, of course, set before the car reaches it. Returning now to junction-point H, following the other branch of the circuit and remembering that with the car running at normal speed the governor-arm would be on contact-point $Q^9$, (as indicated by the dotted line on Fig. 8,) circuit passes to brush $B'$, ring 1, resistance $R^9$, contact $Q^9$, (contacts $Q^{10}$, $Q^{11}$, and $Q^{12}$ are omitted in this figure,) and thence by governor-arm G to contact-plate $C^5$, to ring 3, brush $B^3$, controller-solenoid $M^4$, contact $N'$, and so to return. Solenoid $M^4$ now being energized would move the controller-finger F momentarily over to contact-point $Q^5$, (see also Fig. 10,) and the effect of this, which has already been described in detail in a preceeding paragraph, (the car attains excessive speed, &c.,) is that the motor-current is reduced and brake applied.

We now proceed to describe how, fifth, the car is brought to reduced speed and runs upon the station-loop. As the speed has fallen the governor-arm G has gradually swung inward to its "slow-running" position in which it is shown in Fig. 8—that is, in contact with contact-point $Q^6$—cutting in the resistances $R^8$, $R^7$, and $R^6$, and so gradually reducing the current in the controller-solenoid $M^4$. The finger F is then slowly carried back by its volute spring from $Q^5$ over the resistances $R^4$ $R^3$ $R^2$ $R'$ to $Q^2$, reducing the strength of the braking-solenoid $M^2$ and increasing that of the brake-release solenoid M' and the flow of current through the motor. When the car attains its predetermined slow-running speed, the controller-finger F is in contact with contact-point $Q^2$, the resistance $R'$ being so adjusted as to send a current of such strength from $R^2$ to motor as to produce the slow speed of the car. This current passing through the solenoid M' also holds off the brake. The car traveling at this slow speed clears the switch, and then trolley $T^3$ runs off the end of switch-line $L^3$. (See Fig. 4.) Solenoid $M^{11}$ then becoming dead its spring $S^4$ opens the switch. The car then runs into the station on the current from station-line $L^2$ at slow speed, and since $L^2$ stops a little before the car reaches the station (see Fig. 4) as the car leaves it all current will cease to flow to motor and brake solenoids, so that the brake-spring S' will apply the brake and bring the car to rest, as shown in Fig. 5. The car having been unloaded, may be refilled and directed to any station on the line or the main depot by adjusting the arm P to suitable position. The attendant starts it on its journey by pushing it by hand until it reaches the inclined portion of the loop, down which it passes by gravity until it reaches the track, along which it travels, as already described.

Figure 6:
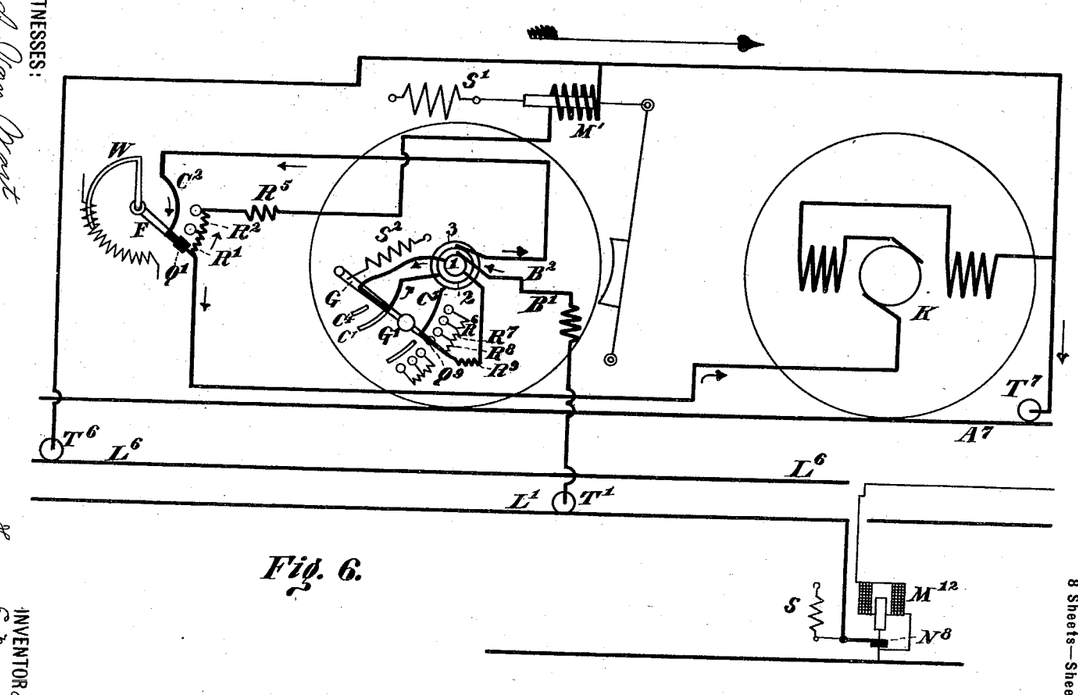
Fig. 6 is an electrical diagram showing the relation of parts, mechanism, and connections with the car running at normal speed on the main trolley-line.

It has of course been assumed in the foregoing that the track-switch whereby the car has been shunted to the station-loop has worked properly. We now assume, sixth, the switch has failed properly to close or the car having passed upon the loop has failed properly to open. These contingencies are guarded against in the following manner, referring to Fig. 9: Secured to the movable core of solenoid $M^{11}$ is a finger $F^3$, which as said core moves in and out of the solenoid passes over and makes contact with a fixed contact-plate $C^6$. The width of this plate is such that the finger $F^3$ runs off of it at one side or the other only when the switch is fully closed or fully open. The finger $F^3$ is connected by a flexible connection with the main feeder-line D, so that when said finger is in contact with the plate $C^6$ current may pass from said feeder to the finger and so to the plate, and thence to the safety-line $L^4$, connected to said plate. From line $L^4$ current proceeds to trolley $T^4$ and thence to a solenoid $M^6$ on the car. As shown in Fig. 10, the core of this solenoid has a retracting-spring $S^5$ and actuates a pivoted circuit-closing lever $O^6$ to make and break contact at $N^4$, and also another circuit-closing lever $O^5$, which on one side makes or breaks a double contact at $N^5$ and on the other side a single contact. The arrangement of levers $O^5$ and $O^6$ is such that when solenoid $M^6$ is energized the double contact at $N^5$ and the contact at $N^4$ are closed simultaneously. The current now proceeds as follows: After passing through solenoid $M^6$ it goes to return. When contact $N^4$ is closed, it bifurcates, part flowing through resistance $R^{18}$ to solenoid $M^3$ to return, thus closing contact at $N'$, and part passing through a shunt between solenoids $M^6$ and a resistance $R^{13}$ to the double contact $N^5$, both to controller-solenoid $M^4$ and contact-plate $C'$. Solenoid $M^4$ then carries finger F over to contact $Q^5$, cutting resistances into the motor-circuit and that of brake-release solenoid $M'$ and out of the circuit of brake-solenoid $M^2$. Current is thus cut off from the motor and brake-release solenoid $M'$, and the brake is heavily applied by solenoid $M^2$, which is energized by the current flowing through contact $M^5$, plate $C'$, controller-finger F, contact-point $Q^5$, resistance $R^{17}$, and solenoid $M^2$ to return. The car therefore stops almost immediately. As soon as the switch is properly opened or closed the contact-finger $F^3$ runs off of contact-plate $O^6$ on one side or the other, thus breaking circuit from the main feeder to trolley $T^4$. Solenoids $M^6$ and $M^3$ then permit their associated springs to open the contacts $N^4$ and $N^5$, whereupon the controller-solenoid $M^4$ allows finger F to return to the position it occupied immediately prior to the stoppage of the car, the brake is released, trolley connection to motor is restored, and the car resumes its travel. If the car continues its journey on the main line, as shown in Fig. 6, contact at $N'$ will be opened; but if after passing on the loop the switch closes imperfectly behind it still the trolley $T^2$ will continue in contact with station $L^2$, and therefore the car in the loop will be permitted to continue its travel to the station, although a following car on the main line will be stopped.

Figure 11:
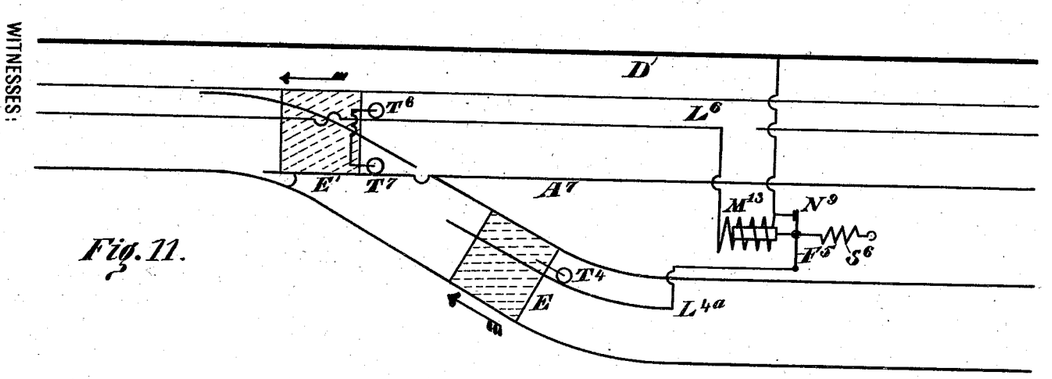
Fig. 11 is a plan view showing the track connections and the cars under the condition when there is danger of rear collision of the car running from the loop with the car already upon the main track.

We now assume, seventh, the car being ready to start on its return journey, another car running on the track upon which it is about to enter gets in the way. Referring now to Fig. 11, in which E represents the car on the loop moving, as indicated by the arrow adjoining it, and E' represents another car on the main track also moving, as the arrow next to it indicates, obviously there is danger of E running into E'. This, however, is prevented by delaying car E, while allowing car E' to go on. It has already been shown how a current proceeding from line $L^4$ to trolley $T^4$ stops the car. In the station-loop is provided a short section of line $L^{4a}$, which is connected to main feeder D through a contact $N^9$, governed by finger $F^5$, which is controlled by solenoid $M^{13}$. One terminal of $M^{13}$ is connected to the feeder D and the other to the breaker-line $L^6$. Normally the solenoid $M^{13}$ not being energized contact $N^9$ is broken by the retracting-spring $S^6$. If, however, a car E' takes position on the line-block in front of car E, then circuit is established from feeder D through solenoid $M^{13}$ to breaker-line $L^6$ and through the car connections to return-trolley $T^7$ and return-line $A^7$. Solenoid $M^{13}$ then closes contact $N^9$, current passes from feeder D to trolley $T^4$ of car E, and car E stops until car E' clears the block.

Figure 12:
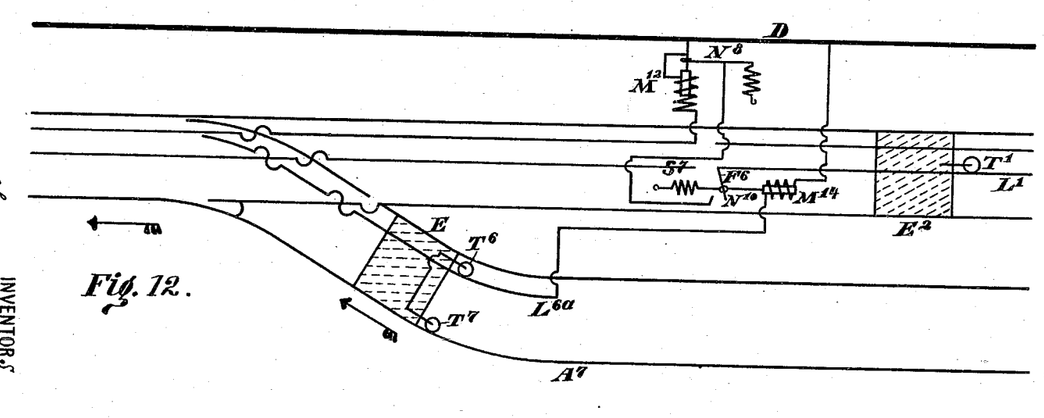
Fig. 12 represents similar conditions when the car coming from the loop is in danger of being run into by the car on the main track.

Eighth. The car being ready to start on its return journey another car running on the track upon which it is about to enter is liable to overtake it, Fig. 12. Here E is the car coming upon the track from the loop, and $E^2$ is the overtaking car. It is necessary to delay $E^2$ and allow E to go on. The trolley $T'$ of $E^2$ is running on the main line $L'$, current passing to it from main feeder D by contact $N^8$, as already described. In the circuit from $N^8$ to main line $L'$ is interposed a circuit-closing finger $F^6$, normally caused by its retracting-spring $S^7$ to close the contact $N^{10}$. Said finger is controlled by solenoid $M^{14}$, one terminal of which is connected to main feeder D and the other to a short line $L^{6a}$ in the station loop. Assuming now that the car $E^2$ is running on its track, contact $N^{10}$ being closed, the arrival of car E upon the short line $L^{6a}$ closes circuit from $L^{6a}$ through car-trolley $T^6$ to trolley $T^7$ and return-rail $A^7$. Solenoid $M^{14}$ being energized opens contact N¹⁰, breaking circuit from feeder D to trolley T' of car E², and accordingly car E² stops, while car E proceeds.

We claim—

1. In an electric railway, a track, a car adapted to travel on said track, an electrically-controlled brake mechanism on said car, fixed circuit-terminals placed at intervals along said track and in proximity thereto, and a selective device carried by said car whereby circuit may be automatically closed from any predetermined fixed terminal to the electric mechanism of said brake, and said brake thereby actuated.

2. In an electric railway, a track, a car adapted to travel on said track, an electrically-controlled brake mechanism on said car, a plurality of line conductors each communicating with a source of current disposed at intervals along said track and a circuit-closing device carried by said car and adjustable thereon to make contact with any one of said line conductors and thereby to close circuit through the electric brake mechanism of said brake to actuate the same.

3. In an electric railway, a track, a series of fixed circuit-terminals disposed at intervals beside said track and connected to a source of current-supply, an electrically-controlled brake mechanism on said car and a pivoted circuit-closing arm carried by said car; the said circuit-terminals being placed in different positions on an arc struck from the pivot center of said arm and the said arm being adjustable to make contact with any one of said terminals and thereby to establish circuit from said terminal to said brake mechanism to operate said brake.

4. In an electric railway, a track, a plurality of fixed circuit-terminals in proximity thereto, a car, an electrically-controlled brake mechanism on said car, and a circuit-closer on said car adjustable to close circuit through any one of said terminals and said brake mechanism and thereby automatically to operate said brake.

5. In an electric railway, a track, a plurality of fixed circuit-terminals in proximity thereto, a car, an electrically-controlled speed-regulating mechanism on said car, and a circuit-closer on said car adjustable to close circuit through any one of said terminals and said regulating mechanism and thereby automatically to modify the speed of said car.

6. In combination with a main-line conductor and a car provided with means for taking current from said conductor, an arm pivoted eccentrically on one of said car-wheels, a variable resistance controlled by said arm, and an electrically-actuated brake mechanism on said car having said variable resistance in circuit; whereby changes in position of said arm due to changes in centrifugal force dependent on the speed of rotation of said car-wheel shall cause a variation in the strength of the current actuating said brake mechanism.

7. In combination with a track and line conductor L', a car E adapted to travel on said track, having trolley T' running on line L', governor-arm G pivoted on a wheel of said car, retracting-spring S³ on said arm, variable resistances on said wheel traversed by said arm, pivoted brake-arm U² and brake-shoe carried thereby, solenoids M' M² controlling said brake-arm U², and circuit connections between said resistances and said solenoids.

8. In combination with a main-line conductor, a car provided with means for taking current from said conductor, an arm pivoted eccentrically to one of said car-wheels, a variable resistance controlled by said arm, a driving-motor for said car and an electrically-actuated brake mechanism on said car, said motor and brake mechanism being in circuit with said resistance; whereby changes in position of said arm due to changes in centrifugal force dependent on speed of rotation of said car shall cause a variation in strength of current operating said brake mechanism and said motor.

9. In an electric railway, a main-line conductor, a car provided with means for taking current from said conductor, and, on said car, an electrically-actuated brake mechanism, a motor, a controlling device constructed to control the current passing to both brake mechanism and motor and a current-changing centrifugal governor actuated by said car-wheel and operating said controlling device.

10. In an electric railway, a main-line conductor, a car provided with means for taking current from said conductor, and, on said car, an electrically-actuated brake mechanism, a controlling device constructed to control the current passing to said brake mechanism, and a current-changing centrifugal governor actuated by said car-wheel and operating said controlling device.

11. In an electric railway, a main-line conductor, a car provided with means for taking current from said conductor, means on said car for varying the strength of said current, a solenoid operated by said variable current, an electric brake mechanism and means controlled by said solenoid for actuating said brake mechanism.

In testimony whereof we have signed our names to this specification in the presence of two subscribing witnesses.

THOMAS E. MURRAY.
JOHN VAN VLECK.

Witnesses:
  JOS. WILLIAMS,
  HENRY M. SEELY.